United States Patent
Herda et al.

(10) Patent No.: US 12,272,919 B2
(45) Date of Patent: Apr. 8, 2025

(54) GENERATION OF ULTRASHORT LASER PULSES

(71) Applicant: Toptica Photonics AG, Gräfelfing (DE)

(72) Inventors: Robert Herda, Munich (DE); Axel Friedenauer, Hohenschaftlarn (DE)

(73) Assignee: Toptica Photonics AG, Gräfelfing (DE)

( * ) Notice: Subject to any disclaimer, the term of this patent is extended or adjusted under 35 U.S.C. 154(b) by 268 days.

(21) Appl. No.: 16/588,284

(22) Filed: Sep. 30, 2019

(65) Prior Publication Data

US 2021/0098960 A1   Apr. 1, 2021

(51) Int. Cl.
  *H01S 3/00* (2006.01)
  *G02F 1/37* (2006.01)
  *H01S 3/109* (2006.01)

(52) U.S. Cl.
  CPC .............. *H01S 3/109* (2013.01); *G02F 1/37* (2013.01); *H01S 3/0057* (2013.01); *H01S 3/0092* (2013.01)

(58) Field of Classification Search
  CPC ...... H01S 3/0057; H01S 3/0092; H01S 3/109; H01S 3/1106; G02F 1/35; G02F 1/3507;
  (Continued)

(56) References Cited

U.S. PATENT DOCUMENTS 6,198,568 B1   3/2001   Galvanauskas et al.
6,726,763 B2   4/2004   Lee et al.
(Continued)

FOREIGN PATENT DOCUMENTS

WO   WO-2015165882 A1 * 11/2015 ............ G02F 1/3511

OTHER PUBLICATIONS

M. A. Arbore, M. M. Fejer, M.E. Fermann, A. Haribaran, A. Galvanauskas and D. Harter, "Frequency doubling of femtosecond erbium-fiber soliton lasers in periodically poled lithium niobate", Optics Letters, vol. 22, No. 1, Jan. 1, 1997, pp. 13-15.
(Continued)

*Primary Examiner* — Xinning(Tom) Niu
*Assistant Examiner* — Delma R Forde
(74) *Attorney, Agent, or Firm* — Adams and Reese LLP; John Henry Scott, III

(57) ABSTRACT

It is an object of the invention to provide a method and a corresponding laser system that are simple and robust and that are able to provide sub-100 fs laser pulses using nonlinear frequency-conversion. The method of the invention comprises the steps of generating pulsed laser radiation at a fundamental wavelength, increasing the spectral bandwidth of the laser radiation by passing the laser radiation through a periodically poled nonlinear crystal material whose poling period is larger than or smaller than the poling period satisfying the quasi-phase-matching condition at the fundamental wavelength, and frequency-converting the spectrally broadened laser radiation. The laser system of the invention comprises a laser source generating pulsed laser radiation at a fundamental wavelength, a first periodically poled nonlinear crystal section arranged in the beam path and having a poling period larger than or smaller than the poling period satisfying the quasi-phase-matching condition at the fundamental wavelength to spectrally broaden the laser radiation, and a second periodically poled nonlinear crystal section arranged in the beam path downstream of the first section, wherein the second section is quasi-phase-matched at the fundamental wavelength to frequency-convert the laser radiation.

15 Claims, 3 Drawing Sheets

(58) Field of Classification Search
CPC ........ G02F 1/353; G02F 1/3548; G02F 1/355; G02F 1/3551; G02F 1/37; G02F 1/3775
See application file for complete search history.

(56) References Cited

U.S. PATENT DOCUMENTS 7,190,705 B2    3/2007   Fermann et al.
7,529,281 B2 *  5/2009   Leonardo ................ G02F 1/353
                                                                   372/21

OTHER PUBLICATIONS

M. A. Arbore, A. Galvanauskas, D. Harter, M. H. Chou, and M. M. Fejer, "Engineerable compression of ultrashort pulses by use of second-harmonic generation in chirped-period-poled lithium niobate", Optics Letters, vol. 22, No. 17, Sep. 1, 1997, pp. 1341-1343.
F. Baronio, C. De Angelis, M. Marangoni, C. Manzoni, R. Ramponi, and G. Cerullo, Optics Express, vol. 14, No. 11, May 29, 2006, pp. 4774-4779.

* cited by examiner

GENERATION OF ULTRASHORT LASER PULSES

FIELD OF THE INVENTION

The invention relates to a method for generating pulsed laser radiation. Further, the invention relates to a laser system for generating pulsed laser radiation.

BACKGROUND OF THE INVENTION

There is still an increasing interest in the technology of ultrashort pulsed laser systems. A pulse duration down to a single optical cycle and a peak power up to tera or even peta Watt are already feasible today. A lot of promising applications have emerged for which the high peak power and ultrashort pulse duration of ultrafast lasers are particularly attractive. Both give rise to nonlinear effects and open new paths in engineering and scientific research. The users of the technology require simple and robust devices that are comfortable in handling and can easily be integrated into complex experiments and instruments. Fields of application of such laser systems are, e.g., life sciences, Terahertz spectroscopy, 2-photon polymerization, optical coherence tomography, pump-probe spectroscopy, material processing and metrology.

Commercial ultrafast laser systems are advantageously realized as fiber laser systems. A summary of the technology of fiber lasers for generating ultrashort laser pulses and their applications has been provided by Marion Lang, Thomas Hellerer and Juergen Stuhler ("Technology and applications of ultrafast fiber lasers," Proc. SPIE 8330, Photonics and Optoelectronics Meetings (POEM) 2011: Laser and Terahertz Science and Technology, 833007).

Fiber laser gain materials typically have a limited bandwidth compared to solid-state laser systems (e.g. Titan: Sapphire lasers). This effect can be limiting in laser systems that use frequency-conversion (e.g. frequency-doubling) to provide pulsed laser radiation at a desired wavelength that is different from the fundamental wavelength of the laser radiation generated in the fiber gain material. User often demand a specification of sub-100 fs laser pulses. However, without specific measures for spectral broadening commercial fiber laser-based systems typically provide frequency-converted laser pulses having a duration of significantly more than 100 fs. The nonlinear frequency-conversion causes a shortening of the laser pulses. However, this shortening is limited to a minimum factor of $1/\sqrt{2}$ compared to the original pulse length, which is often not sufficient. Methods that are known to be suitable to achieve short pulse durations by spectral broadening are self-phase modulation and solitonic compression in third-order nonlinear materials. Depending on the pulse energy, the nonlinearity of typical bulk materials may be too small to achieve significant spectral broadening. Broadening in an optical fiber is possible. However, suitable photonic crystal fibers have to be used and the resulting fiber lengths are inconvenient. Furthermore, additional robust free-beam optics are necessary to couple efficiently into the fiber.

SUMMARY OF THE INVENTION

From the foregoing it is readily appreciated that there is a need for an improved technique of generating pulsed laser radiation. It is an object of the invention to provide a method and a corresponding laser system that are simple and robust and that are able to provide sub-100 fs laser pulses using nonlinear frequency-conversion.

In accordance with the invention, a method for generating pulsed laser radiation is disclosed. The method comprises the steps of:
generating pulsed laser radiation at a fundamental wavelength;
increasing the spectral bandwidth of the laser radiation by passing the laser radiation through a periodically poled nonlinear crystal material whose poling period is larger than or smaller than the poling period satisfying the quasi-phase-matching condition at the fundamental wavelength; and
frequency-converting the spectrally broadened laser radiation.

According to the invention, the pulsed laser radiation at the fundamental wavelength may be generated by means of a conventional and commercially available diode-pumped mode-locked fiber laser (such as, e.g., an Ytterbium-, Erbium-, or Thulium-fiber laser system) with a pulse duration of less than 1 ps, preferably 100 fs to 800 fs, and a repetition rate of 10-100 MHz. The initially generated pulsed laser radiation will typically be amplified, e.g. by means of a conventional rare earth-doped fiber amplifier, to an average power of 100 mW or more to enable efficient nonlinear frequency-conversion.

It is well-known that nonlinear processes (frequency-doubling, sum and difference frequency generation, etc.) are phase sensitive and require phase matching to be efficient. It has to be ensured that a proper phase relationship is established between the waves of the fundamental radiation and the frequency-converted radiation and maintained along the propagation direction in the used nonlinear crystal. Only if the phase matching condition is fulfilled, amplitude contributions from different locations to the resulting radiation are all in phase at the end of the nonlinear crystal. Quasi-phase matching is a known technique for achieving similar results. Instead of a homogeneous nonlinear crystal material, a material with spatially modulated nonlinear properties is used. The idea is essentially to allow for a phase mismatch over some propagation distance, but to reverse the nonlinear interaction at positions where otherwise the interaction would take place with the wrong direction of conversion. In that way, the total amplitude of the frequency-converted radiation can continuously increase along the nonlinear crystal and a sufficient overall conversion efficiency is achieved. Periodic poling of a nonlinear crystal is a known technique for obtaining quasi-phase matching. It involves the generation of a periodic reversal of the domain orientation (domain inversion) in the nonlinear crystal, so that the sign of the nonlinear coefficient also changes. The most common technique for periodic poling is the application of a strong electric field to a ferroelectric crystal via patterned electrodes on the crystal surface, which typically have a period between a few microns and some tens of microns. The poling period (i.e. the period of the electrode pattern) determines the wavelengths for which the nonlinear process is quasi-phase-matched.

The invention exploits that effective spectral broadening by self-phase modulation can be induced on the laser radiation at the fundamental frequency by the cascading interaction with the frequency-converted laser radiation in the nonlinear crystal under phase-mismatch conditions. Thus, the invention proposes to spectrally broaden the pulsed laser radiation by passing it through a periodically poled nonlinear crystal that is phase-mismatched, i.e. the poling period is larger than or smaller than the poling period satisfying the quasi-phase-matching condition at the fundamental wavelength. The phase mismatch depends on the propagation constants of the fundamental and the frequency-converted laser radiation in the nonlinear crystal and the poling period. In a typically used third order material (e.g. Lithium Niobate) the nonlinearity has a positive value. Hence, a poling period larger or smaller than the poling period satisfying the quasi-phase-matching condition can be used to obtain a negative or positive contribution of the self-phase modulation, respectively.

It has to be pointed out that the term "periodically poled nonlinear crystal" used throughout the description and the claims refers to any crystal material with spatially modulated nonlinear properties. The modulation does not have to be strictly periodic. In particular, the period of the spatial modulation may vary along the propagation path of the laser radiation. In other words, the meaning of the term "periodically poled nonlinear crystal" according to the invention also encompasses a "non-uniformly poled nonlinear crystal".

After passing the fundamental laser radiation through the phase-mismatched is periodically poled nonlinear crystal, the resulting spectrally broadened laser radiation is frequency-converted according to the invention. In this way, spectrally broad frequency-converted laser pulses are obtained that support particularly short pulse durations.

The invention requires only the phase-mismatched periodically poled nonlinear crystal to increase the spectral width and to enable the generation of sub-100 fs laser pulses. Hence, the invention provides a very simple, robust and cost-effective solution to the above object of the invention.

In a preferred embodiment, the pulse duration of the frequency-converted laser radiation is shortened by passing the frequency-converted laser radiation through a dispersive element. By passing the frequency-converted laser radiation through an element of suitable dispersion the pulse duration can be reduced in a straight-forward fashion to the minimum value that is supported by the spectral width of the frequency-converted laser radiation. Advantageously, as a result of the spectral broadening step of the invention, the thus shortened pulse duration can be achieved to be less than $1/\sqrt{2}$ times the pulse duration of the laser radiation originally generated at the central wavelength. In other words, the invention enables shortening of the laser pulses significantly beyond the shortening caused by the nonlinear frequency-conversion.

In another preferred embodiment, the originally generated pulsed laser radiation is chirped. In many applications, e.g. in microscopy, a defined pre-chirp of the laser pulses is required to compensate for the dispersion of the optical components downstream in the beam path, e.g. the microscope objective. Typically these optical components have normal dispersion. Thus, laser pulses pre-chirped with anomalous dispersion are required, i.e. a negative pre-chirp. This is conventionally achieved by using Gires-Tournois interferometric (GTI) mirrors, micro-structured fibers, prism pairs or grating pairs. All of these solutions have disadvantages, as high costs and alignment sensitivity. It turns out that the method of the invention enables the transfer of the chirp of the fundamental laser pulses through the frequency-conversion step such that the frequency-converted laser radiation is negatively pre-chirped as required to compensate for the dispersion of the optical components downstream in the beam path. Appropriate (pre-)chirping of the fundamental laser pulses can be achieved, e.g., by using chirped pulse amplification (CPA) in the step of generating the laser radiation at the fundamental wavelength, with suitable adjustment of pulse stretcher and pulse compressor. No additional components are required.

In accordance with the invention, also a laser system for generating pulsed laser radiation is disclosed. The laser system comprises:
  a laser source generating pulsed laser radiation at a fundamental wavelength;
  a first periodically poled nonlinear crystal section arranged in the beam path and having a poling period larger than or smaller than the poling period satisfying the quasi-phase-matching condition at the fundamental wavelength to spectrally broaden the laser radiation; and
  a second periodically poled nonlinear crystal section arranged in the beam path downstream of the first section, wherein the second section is quasi-phase-matched at the fundamental wavelength to frequency-convert the laser radiation.

The laser system implements the afore-described method of the invention by employing the first periodically poled nonlinear crystal section for spectral broadening of the laser radiation and the second periodically poled nonlinear crystal section for frequency-conversion. Hence, both the spectral broadening and the frequency-conversion are effected in a periodically poled nonlinear crystal.

In a particularly advantageous embodiment, the two sections are formed in a single monolithic periodically poled nonlinear crystal.

In a possible embodiment, the single periodically poled nonlinear crystal has two regions of different poling periods, one region (forming the first periodically poled nonlinear crystal section) phase-mismatched for spectrally broadening of the fundamental radiation according to the invention, and one region (forming the second periodically poled nonlinear crystal section) quasi-phase-matched at the fundamental wavelength to frequency-convert the laser radiation.

In another embodiment, the poling period varies linearly along the beam path in at least one of the regions. A linearly chirped periodically poled nonlinear crystal is particularly well suitable for efficient frequency-conversion of chirped laser pulses. Thus, in case of (pre-)chirped laser pulses at the fundamental wavelength, the frequency-conversion efficiency can be improved by making provision for a linearly chirped region (i.e. a region with linearly varying poling period) forming the second periodically poled nonlinear crystal section.

A region of the nonlinear crystal with a fixed (longer or shorter) poling period for spectral broadening through self-phase modulation and a region of chirped periodic poling for frequency-conversion may be replaced by a completely linearly chirped crystal, which means that the poling period varies linearly along the beam path over the entire length of the nonlinear crystal. In this embodiment, longer poling periods in the first section of the nonlinear crystal cause the self-phase modulation, and the shorter poling periods in the second section, i.e. towards the end of the crystal establish quasi-phase-matching to enable the frequency-conversion. This embodiment has the advantage of more "relaxed" design specifications, because the region within the nonlinear crystal where the laser beam is focused and, thus, the poling period that delivers most efficient frequency-conversion can be adjusted.

In another preferred embodiment, the laser system further comprises an adjustable dispersive element arranged in the beam path upstream of the first periodically poled nonlinear crystal section to generate a negative pre-chirp of the laser radiation. The requirement of applying a pre-chirp to the laser pulses has been explained in detail above.

In yet another preferred embodiment, the laser system comprises a dispersive element arranged in the beam path downstream of the second periodically poled crystal section to temporally compress the frequency-converted laser pulses. The laser system of the invention requires only the specific two-region periodically poled nonlinear crystal and the dispersive element to achieve spectral broadening at the fundamental wavelength in combination with temporal compression in the dispersive element to finally obtain frequency-converted laser pulses with minimum (sub-100 fs) pulse duration.

BRIEF DESCRIPTION OF THE DRAWINGS

The enclosed drawings disclose preferred embodiments of the present invention. It should be understood, however, that the drawings are designed for the purpose of illustration only and not as a definition of the limits of the invention. In the drawing.

DETAILED DESCRIPTION OF THE EMBODIMENTS

Figure 1:
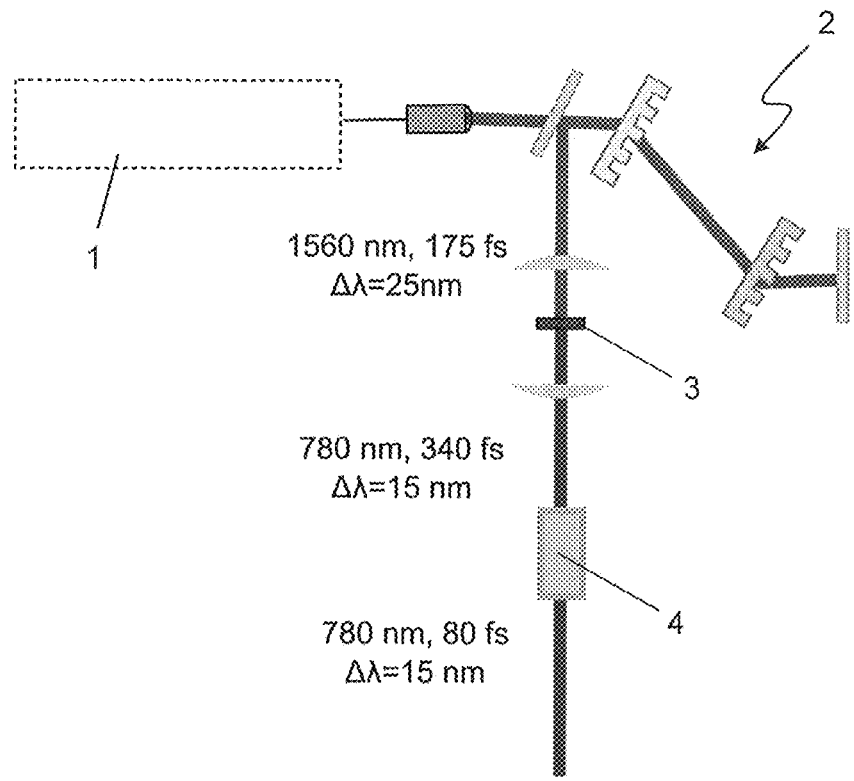
FIG. 1 schematically shows a laser system according to the invention.

FIG. 1 schematically shows an embodiment of a laser system according to the invention.

The laser system comprises a laser source 1. Laser source 1 may include a rare earth ion-doped fiber laser oscillator (not depicted), which emits a laser pulse train at a fixed repetition rate of, e.g., 100 MHz, a section of dispersive optical fiber (not depicted) to temporally stretch the laser pulses, and a diode-pumped fiber amplifier (not depicted) which receives the chirped laser pulses and boosts their energy such that the average power of the amplified pulse train is on the order of 100 mW or more. The thus amplified laser pulses are coupled out of the optical fiber and are temporally compressed in a grating compressor 2. The resulting laser pulses have a duration of 175 fs at a fundamental wavelength of 1560 nm in the depicted embodiment. The spectral width $\Delta\lambda$ of the laser radiation is 25 nm.

The laser pulses are then passed through a non-uniformly poled Lithium Niobate nonlinear crystal (NUPLN) 3, The NUPLN 3 has a length of 2 mm with a linear chirp of the poling period of −2.00 μm/mm With this design, no frequency-conversion but spectral broadening by self-phase modulation occurs in a first section of the NUPLN where the poling period is larger than the poling period satisfying the quasi-phase-matching condition. Frequency-doubling occurs in a second section where the poling period becomes small enough to establish quasi-phase-matching. In this way, laser pulses are generated at 780 nm with a pulse duration of 340 fs and a spectral width $\Delta\lambda$ of 15 nm. This spectral bandwidth supports a pulse duration of 80 fs. The frequency-doubled laser pulses have a negative chirp because the phase mismatch in the first section of the NUPLN 3 is negative. This negative chirp can easily be compensated in a block of dense flint glass 4 as a dispersive element with a length of a few cm. As can be seen, a pulse duration of 80 fs in the second harmonic is achieved with a fundamental pulse duration of 175 fs. The final pulse duration is thus significantly less than $1/\sqrt{2}$ times the pulse duration of the laser radiation at the fundamental wavelength. This is the result of the spectral broadening in the first section of the NUPLN 3.

Figure 2:
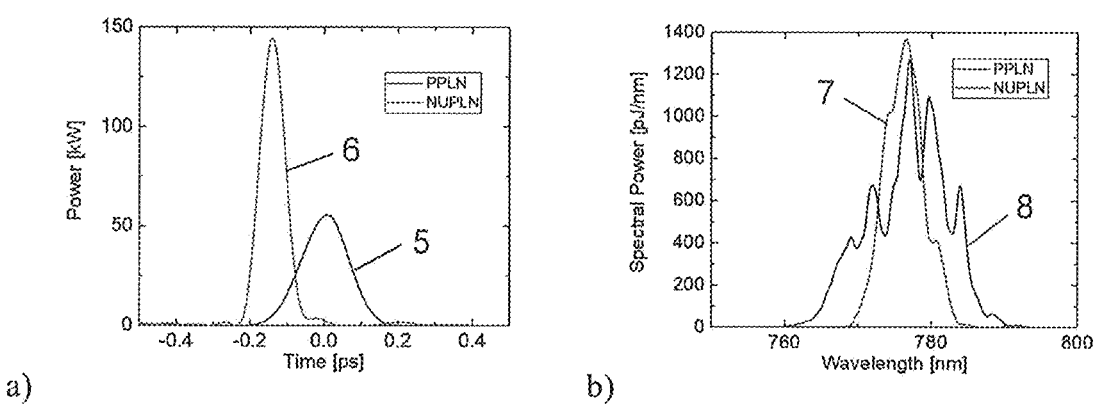
FIG. 2 shows diagrams illustrating the properties (duration, spectrum) of laser pulses generated according to the invention.

The diagram of FIG. 2a shows the temporal course (power as a function of time) of a single pulse at the output of the flint glass block 4. Depicted is a pulse 5 that is generated using a conventional (constant poling period, completely quasi-phase-matched) periodically poled Lithium Niobate crystal (PPLN) in comparison to a pulse 6 that is generated according to the invention using the NUPLN 3 as explained above. As can be seen, the pulse duration is reduced from about 150 fs down to 80 fs by the approach of the invention.

The diagram of FIG. 2b shows the corresponding spectra of the laser pulses. As can be seen, the width of the spectrum 7 obtained using the conventional PPLN is about 6 nm, while the width of the spectrum 8 obtained using the NUPLN 3 is about 15 nm.

Figure 3:
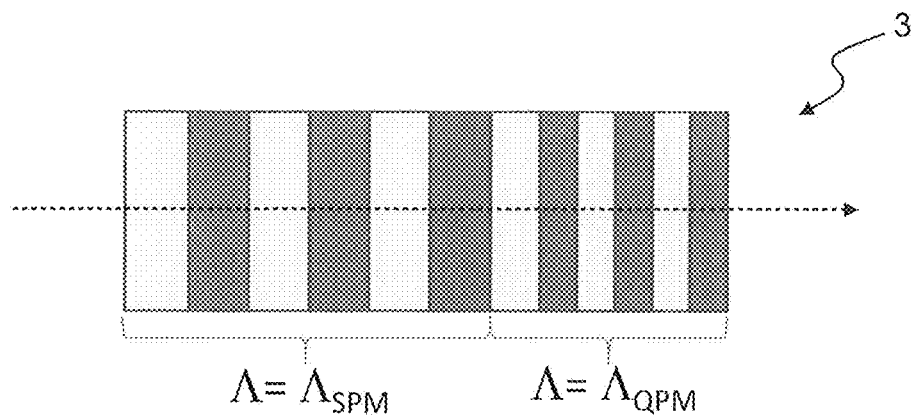
FIG. 3 schematically shows a first design of a periodically poled nonlinear crystal to be used in the laser system of the invention.
Figure 4:
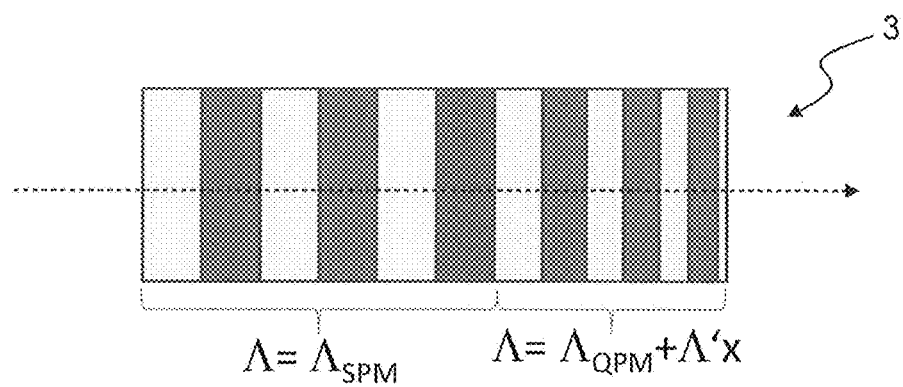
FIG. 4 schematically shows a second design of a periodically poled nonlinear crystal to be used in the laser system of the invention.
Figure 5:
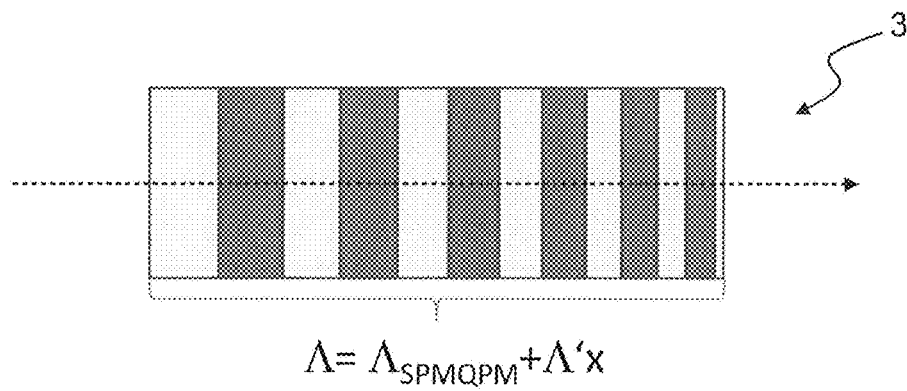
FIG. 5 schematically shows a third design of a periodically poled nonlinear crystal to be used in the laser system of the invention.

FIGS. 3-5 show possible designs of the NUPLN 3 used for spectral broadening and frequency-conversion according to the invention. The beam path and direction of the laser radiation is indicated as a dashed arrow.

FIG. 3 shows a design of the crystal with two different, directly adjacent poling regions, one for self-phase modulation (poling period $\Lambda=\Lambda_{SPM}$) without frequency-conversion taking place, and one for efficient frequency-doubling (poling period $\Lambda=\Lambda_{QPM}$) where the quasi-phase-matching condition is satisfied. However, the efficiency of the frequency-conversion may be reduced in this embodiment because the laser pulse incident onto the second region will generally be chirped and the fixed poling period provides quasi-phase-matching only for the central wavelength but not for the chirped portions of the pulse.

A linear chirp of the poling period in the second region ($\Lambda=\Lambda_{QPM}+\Lambda'x$, x indicating the position along the beam path), as depicted in FIG. 4, turns out to be more efficient for frequency-doubling of chirped laser pulses.

A region with a longer poling period for self-phase modulation and a region with chirped poling providing quasi-phase-matching in a single monolithic periodically poled nonlinear crystal 3 can as well be realized by varying the poling period linearly (linear chirp) along the beam path over the entire length of the nonlinear crystal 3. This is depicted in FIG. 5, where the poling period is $\Lambda=\Lambda_{SPMQPM}+\Lambda'x$. The longer poling periods in the first section of the crystal cause self-phase-modulation, and the shorter poling periods in the second section towards the end of the crystal establish quasi-phase-matching and thus cause frequency-conversion. This embodiment enables relaxed design rules, because the region within the crystal 3 where the laser beam is focused and therefore the poling period for most efficient frequency-conversion can be adjusted.

In other words, the invention proposes to use a monolithic, non-uniformly poled, partially quasi-phase-matched material to broaden the spectrum at the fundamental wavelength of the pulsed laser radiation and frequency-convert the spectrally broadened laser radiation.

Figure 6:
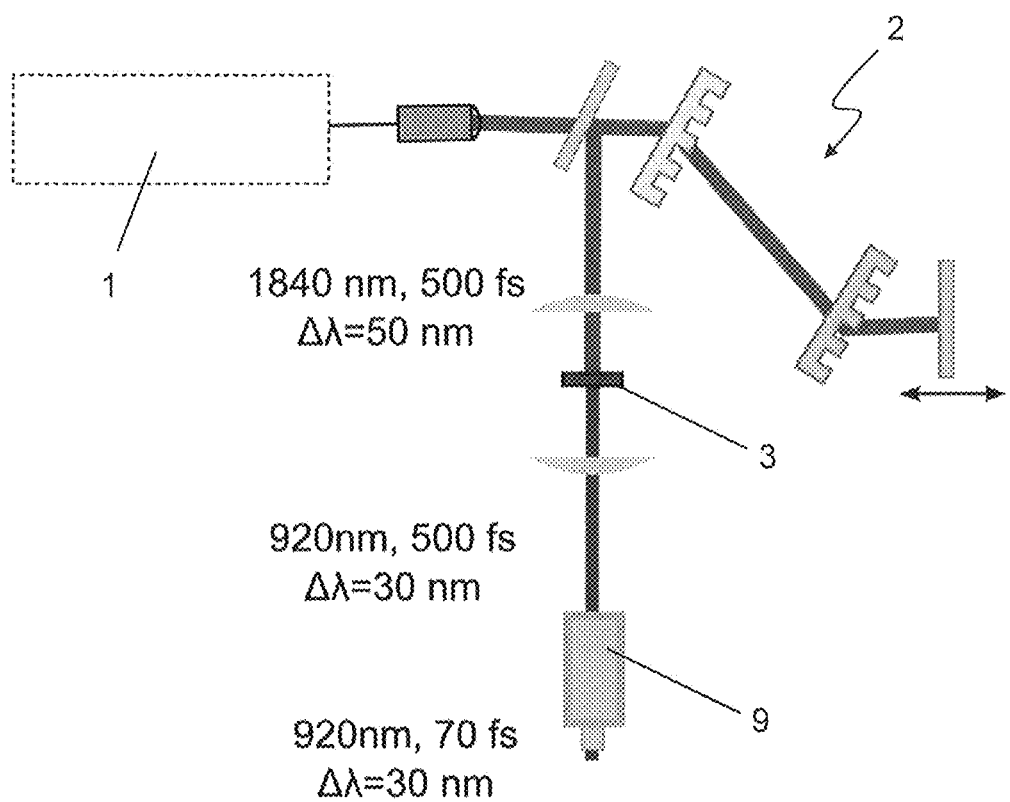
FIG. 6 schematically shows a laser system according to another embodiment of the invention.

As mentioned above, many applications, e.g. confocal microscopy systems, require a defined pre-chirp of the laser pulses to compensate for the dispersion of the optical components downstream in the beam path. In the embodiment of FIG. 6, the grating compressor 2 is used to provide the laser radiation at the fundamental wavelength of 1840 nm with a negative pre-chirp. The resulting laser pulses have a pulse duration of 500 fs at a spectral width of $\Delta\lambda=50$ nm. Again, frequency-doubling is performed using the NUPLN 3 with the design of FIG. 5. The conversion efficiency turns out to be as good as with an un-chirped input pulse in a conventional PPLN. At the frequency-doubled wavelength of 920 nm the pulse duration is still 500 fs at a spectral width $\Delta\lambda$ of now 30 nm. The pre-chirp of the laser pulses is conserved during the frequency-doubling process such that the laser pulses have their shortest duration of 70 fs after passing through the microscope objective 9 having normal dispersion. Fine tuning of the negative pre-chirp can either be performed by inserting glass wedges after the NUPLN 3 before the objective 9, or by adjusting the grating separation in the compressor 2. According to the invention, the NUPLN 3 is used for efficient frequency-doubling with an increased spectral bandwidth. Walk-off in the NUPLN 3 may produce some additional pre-chirp, but it is small compared to the pre-chirp provided by the grating pair 2.

In other words, the approach of the invention enables the transfer of the pre-chirp that can easily be provided at the fundamental wavelength through the frequency-conversion step such that the frequency-converted laser radiation is negatively pre-chirped as required to compensate for the dispersion of the optical components downstream in the beam path. At the same time, a minimum pulse duration in the sub-100 fs region after passing the optical components of the respective application can be achieved by spectral broadening of the fundamental laser radiation in the phase-mismatched nonlinear crystal section according to the invention.

The invention claimed is:

1. Laser system for generating pulsed laser radiation, comprising:
   a laser source generating pulsed laser radiation at a fundamental wavelength;
   a first periodically poled nonlinear crystal section arranged in the beam path and having a poling period larger than or smaller than the poling period satisfying the quasi-phase-matching condition at the fundamental wavelength to spectrally broaden the laser radiation; and
   a second periodically poled nonlinear crystal section arranged in the beam path downstream of the first section, wherein the second section is quasi-phase-matched at the fundamental wavelength to frequency-convert the laser radiation, further comprising an adjustable dispersive element arranged in the beam path upstream of the first periodically poled nonlinear crystal section to generate a negative pre-chirp of the laser radiation.

2. Laser system of claim 1, wherein the two sections are formed in a single monolithic periodically poled nonlinear crystal having two regions of different poling periods.

3. Laser system of claim 2, wherein the poling period varies linearly along the beam path in at least one of the regions.

4. Laser system of claim 2, wherein the two sections are formed in a single monolithic periodically poled nonlinear crystal, with the poling period varying linearly along the beam path over the entire length of the nonlinear crystal.

5. Laser system of claim 1, wherein the laser source comprises a mode-locked, rare-earth doped fiber laser.

6. Laser system of claim 5, wherein the laser source is arranged to emit laser pulses having a duration of less than 1 ps at a repetition rate of 10-100 MHZ.

7. Laser system of claim 5, wherein the laser source further comprises a rare-earth doped fiber amplifier arranged to amplify the pulsed laser radiation to an average power of at least 100 MW.

8. Laser system for generating pulsed laser radiation, comprising:
   a laser source generating pulsed laser radiation at a fundamental wavelength;
   a first periodically poled nonlinear crystal section arranged in the beam path and having a poling period larger than or smaller than the poling period satisfying the quasi-phase-matching condition at the fundamental wavelength to spectrally broaden the laser radiation; and
   a second periodically poled nonlinear crystal section arranged in the beam path downstream of the first section,
   wherein the second section is quasi-phase-matched at the fundamental wavelength to frequency-convert the laser radiation, wherein a dispersive element is arranged in the beam path downstream of the second periodically poled crystal section to temporally compress the frequency-converted laser radiation.

9. Laser system of claim 8, wherein the two sections are formed in a single monolithic periodically poled nonlinear crystal having two regions of different poling periods.

10. Laser system of claim 9, wherein the poling period varies linearly along the beam path in at least one of the regions.

11. Laser system of claim 9, wherein the two sections are formed in a single monolithic periodically poled nonlinear crystal, with the poling period varying linearly along the beam path over the entire length of the nonlinear crystal.

12. Laser system of any one claim 8, wherein the laser source comprises a mode-locked, rare-earth doped fiber laser.

13. Laser system of claim 8, wherein the laser source is arranged to emit laser pulses having a duration of less than 1 ps at a repetition rate of 10-100 MHz.

14. Laser system of claim 13, wherein the laser source further comprises a rare-earth doped fiber amplifier arranged to amplify the pulsed laser radiation to an average power of at least 100 MW.

15. Laser system for generating pulsed laser radiation, comprising:
   a laser source generating pulsed laser radiation at a fundamental wavelength;
   a first periodically poled nonlinear crystal section arranged in the beam path and having a poling period larger than or smaller than the poling period satisfying the quasi-phase-matching condition at the fundamental wavelength to spectrally broaden the laser radiation; and
   a second periodically poled nonlinear crystal section arranged in the beam path downstream of the first section,
   wherein the second section is quasi-phase-matched at the fundamental wavelength to frequency-convert the laser radiation,
   further comprising an adjustable dispersive element arranged in the beam path upstream of the first periodically poled nonlinear crystal section to generate a negative pre-chirp of the laser radiation; and wherein a dispersive element is arranged in the beam path downstream of the second periodically poled crystal section to temporally compress the frequency-converted laser radiation.

\* \* \* \* \*